April 17, 1956     H. H. GROSS     2,742,400
METHOD OF REFINING OIL WITH A SELECTIVE SOLVENT
Filed Oct. 6, 1952
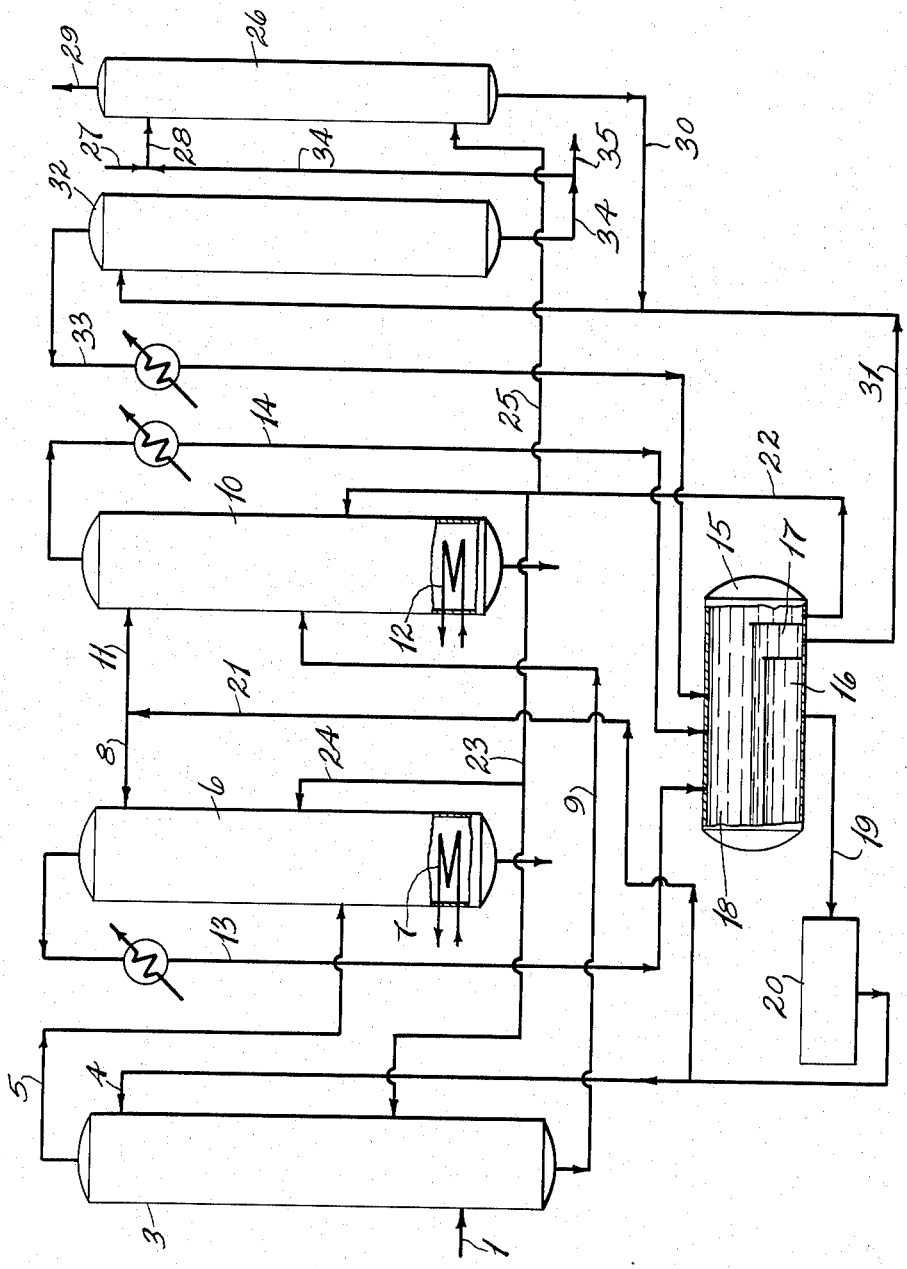
INVENTOR.
HOWARD H. GROSS
BY
*J. H. Grahame*
ATTORNEY

United States Patent Office 2,742,400
Patented Apr. 17, 1956

2,742,400
METHOD OF REFINING OIL WITH A SELECTIVE SOLVENT

Howard H. Gross, Pleasantville, N. Y., assignor to Texaco Development Corporation, New York, N. Y., a corporation of Delaware Application October 6, 1952, Serial No. 313,291

5 Claims. (Cl. 196—14.26)

The present invention relates to the extraction of an oil in the gas oil boiling range with a solvent liquid such as furfural.

In accordance with such solvent extraction operations, the feed oil is extracted with an organic solvent, as above, which has a relatively higher solvent affinity for the aromatic constituents, and also for sulfur compounds and for olefins or unsaturates. Therefore, the raffinate phase comprises the non-aromatic, saturated relatively insoluble constituents of the oil with a relatively small proportion of the solvent and is relatively low in sulfur, whereas the extract comprises the relatively aromatic, olefinic and sulfur containing compounds dissolved in the main body of the solvent.

The extract and raffinate phases are separately subjected to fractional distillation and stripping to remove the solvent from the oil, and the resulting distillates are condensed and permitted to settle.

It has been heretofore proposed to carry out the extraction of the feed oil and distillation of the respective phases with an essentially dry solvent. It has also been proposed to introduce substantial quantities of water into the fractionation or the stripping zones or both to effect an azeotropic distillation. In such a process, the condensed distillate is caused to settle with formation of respective oil-rich, water-rich, and solvent-rich liquid layers. The oil-rich layer may be continuously recycled to the fractionation or stripping zones, or the initial extraction step. The water-rich layer may be recycled in part to the fractionating zone to maintain therein a substantial quantity of water effective to cause an azeotropic fractionation, the remainder being treated for the recovery of contained solvent. The solvent-rich liquids may be returned as solvent feed to the extraction zone, either directly or after first drying the solvent.

The present invention contemplates critically regulating the amount of water entering the extraction and distillation zones corresponding to and no greater than that which saturates the solvent entering these zones at temperatures in the range of 75–125° F. Therefore, the invention may be practiced by employing an extraction solvent containing water in an amount equivalent to saturation at the foregoing temperatures. In such case, the introduction of any appreciable quantity of additional water as by water refluxing, steam stripping, etc. is avoided.

When so operating, a stream of solvent is also advantageously supplied to the top of the extract and raffinate strippers or stills to effect a continuous top reflux. The refluxing solvent, as above indicated, also contains water (or such water may be separately added) in an amount corresponding to saturation at about 75–125° F. Moreover, a substantially increased temperature is maintained in the lower portion of each stripping or fractionating tower sufficient to vaporize a substantial portion, as for example, 5–50% of the oil, in the central portion of the tower. The oil vapors rising in the tower accordingly support solvent refluxing with all of the solvent and dissolved water ultimately passing overhead.

As above intimated, the introduction of additional water at any point in the extraction or the raffinate or extract stripping zones, such for example as the addition of decanted product water or the introduction of direct steam, is strictly avoided.

As a result, the carry-over of oil in the overhead from the raffinate and extract strippers is greatly minimized, resulting in an improved direct yield of product raffinate and extract from the bottoms of the respective fractionators. The present process avoids the lower extraction yields where dry extraction solvent is employed, and likewise avoids undesired carryover of oil from the stripping zones which results from azeotroping in the presence of larger quantities of water.

In practicing the present process, the solvent feed to the extraction zone as well as the solvent reflux stream may be the aforementioned solvent-rich layer separated by decantation from the condensed distillates of the raffinate and/or extract stripping steps. Decantation or separation of the condensed distillate is effected at a temperature in the aforesaid range of 75–125° F. Therefore, the stream drawn off from the solvent-rich layer contains water in the amount required to maintain the desired quantity of water in the extraction and distillation zones.

The decanted oil, which accumulates in the decanter, apart from that which may be returned to the aforementioned stripper and the extraction tower, may be washed with fresh water to recover any dissolved solvent. The resulting wash water together with the separated water-rich layer which forms in the decanter may be distilled to eliminate water and yield as a distillate a water-furfural azeotrope. The water-furfural distillate is preferably condensed and returned to the decanter or separator, thus continuously maintaining therein sufficient water to supply the requirements for saturating the furfural layer.

For example, referring to the attached flow diagram, a gas oil charge having an A. P. I. gravity of about 30, a boiling range of about 440–620° F. and a cetane number of about 35 is introduced through pipe 1 to the lower portion of primary extraction tower 3, of conventional type. The feed oil rises through the packing of the tower countercurrent to a stream of solvent introduced at the top through pipe 4. The solvent comprises furfural containing water in an amount corresponding to that required to saturate the furfural at a temperature in the range of about 75–125° F. About one-half to one volume of solvent is introduced to the tower for each volume of feed oil and the tower temperatures are regulated to a bottom temperature of about 85–100° F. and a top temperature of about 120–140° F. In general, solvent dosage and extract tower temperatures, in the lower portion of the foregoing ranges, are observed when processing a cycle gas oil feed stock, whereas the temperatures and solvent dosage are advantageously chosen from the upper portions of said ranges in the case of a virgin gas oil feed.

Resulting raffinate oil containing a relatively small portion of the solvent passes through pipe 5 into raffinate oil stripper 6 wherein the solvent and contained moisture is distilled from the raffinate, yielding as bottoms a product, raffinate oil stream. Reboiler 7 at the bottom of the tower 6 maintains a bottom temperature of about 550° F., and a continuous stream of solvent is introduced at the top of the tower 6 through pipe 8. Therefore, continual refluxing of the added solvent is maintained at the tower top.

In like manner, the extract phase from the bottom of the extraction tower 3 is passed through pipe 9 into extract oil stripping tower 10 which yields a bottom component of solvent-free product extract oil and an overhead distillate comprising solvent, together with some water and oil. Here likewise, a top furfural reflux stream is introduced through pipe 11. A reboiler element 12 at the bottom of tower 10 maintains a temperature of about 550° F. at this point to support refluxing of the solvent at the top of the tower at a temperature of about 325° F.

The overhead from the strippers 6 and 10 is conveyed respectively through pipes 13 and 14 in which are disposed condensers as indicated to settling chamber 15 in which separation occurs, as indicated, into a lower furfural-rich layer 16, an intermediate water-rich layer 17, and an upper oil-rich layer 18. The temperature of the settling chamber is maintained at a value in the range of 75—125° F., and therefore, the furfural layer contains dissolved water in a proportion of about 5% corresponding to saturation at this temperature. The thus separated furfural layer is continuously withdrawn through pipe 19 through surge tank 20 and passed in part into aforementioned pipe 4 supplying the solvent charge to the extraction zone. The remainder passes through branch pipe 21 into the previously mentioned pipes 8 and 11 supplying refluxing solvent to the top portion of the raffinate and extract strippers 6 and 10 respectively.

Therefore the amount of water in the strippers never appreciably exceeds that required to saturate the solvent at the separation temperature.

The oil layer 18 formed in the settling chamber 15 is passed in part through pipe 22 and branch pipes 23 and 24 to the respective strippers and the extraction tower or to any one or two of them. The remainder is drawn off through branch pipe 25 to wash tower 26 for countercurrent washing. The wash water is introduced through pipe 28, and is preferably supplied from the water fractionation tower 32 to be later described. Fresh water, as required, is added thru line 27. The washed light oil delivered at the top of tower 26 is withdrawn via pipe 29.

The wash water from the bottom of tower 26, containing solvent washed from the oil, is withdrawn through pipe 30, combined with the water-rich layer withdrawn from settling chamber and passed through pipe 31 into a secondary fractionating tower 32. Tower 32 eliminates solvent-free water as bottoms and delivers overhead an azeotropic mixture of furfural and water which is continuously directed through pipe 33 preferably containing a cooler, as indicated, into the settling chamber 15. The bottom product from tower 32 consisting of water essentially free of solvent, is drawn off and preferably passed thru line 34 connecting with aforesaid pipe 28 which feeds wash water to tower 26. Excess water, if any, may be withdrawn from the system thru line 35.

In this system, therefore, a water layer is continuously maintained in the settling chamber 15 to assure saturation of separated solvent layer with water at the prevailing temperature. Therefore, solvent withdrawn from the solvent-rich layer of the settling chamber and cycled to the stripping and extraction zones inherently contains the correct amount of water to maintain the critical water concentration in the extraction and fractionation system. This, together with the continual top solvent reflux of the distillation zones serves to greatly minimize the oil carry-over and thus correspondingly increase the direct production of product raffinate and extract.

In place of furfural, may be employed other relatively high boiling organic solvent liquids which are miscible to some extent with water, such as other derivatives of the furan group, and other aldehydes such as benzaldehyde, and ketones, etc.

Obviously many modifications and variations of the invention, as hereinbefore set forth may be made without departing from the spirit and scope thereof, and therefore only such limitations should be imposed as are indicated in the appended claims.

I claim:
1. A process for the liquid-liquid solvent extraction of a charge oil containing aromatic and non-aromatic hydrocarbons which comprises contacting said charge oil in an extraction zone with liquid furfural to form a liquid raffinate phase and a liquid extract phase, introducing said raffinate phase into a first fractionation zone, recovering overhead from said first zone an azeotropic mixture containing furfural, water and a hydrocarbon, withdrawing from said first zone a raffinate substantially free from furfural, introducing said liquid extract phase into a second fractionation zone, recovering overhead from said second zone an azeotropic mixture containing furfural, water and a hydrocarbon, withdrawing from said second zone an extract substantially free of furfural, condensing the overhead azeotropic mixtures from said first and second zones and separating therefrom in a settling zone three liquid phases: an upper oil-rich phase, intermediate water-rich phase and a bottom furfural-rich phase containing dissolved water, said settling zone being maintained at a temperature in the range 75–125° F., and recycling a portion of said furfural-rich phase to said extraction zone and to said first and second fractionation zones, the amount of water dissolved in said recycled furfural-rich phase being sufficient to form the aforesaid azeotropic mixtures produced overhead from said first and second fractionation zones, the water contained in said furfural-rich phase recycled to said extraction zone and to said first and second fractionation zones being the only water introduced into said zones.

2. A process according to claim 1 wherein said extraction zone is a vertically extending extraction zone, the upper portion of which is maintained at a temperature in the range 120–140° F. and the lower portion of which is maintained at a temperature in the range 85–100° F., and wherein the lower portions of said first and second fractionation zones are maintained at a temperature of about 550° F.

3. A process according to claim 1 wherein said furfural-rich liquid phase recycled to the extraction zone and to the first and second fractionation zones contains about 5 per cent water.

4. A process according to claim 1 wherein said extraction zone is a vertically extending extraction zone, the upper portion of which is maintained at a temperature in the range 120–140° F. and the lower portion of which is maintained at a temperature in the range 85–100° F., and wherein the lower portions of said first and second fractionation zones are maintained at a temperature of about 550° F. and wherein said furfural-rich phase recycled to the extraction and the first and second fractionation zones contains about 5 per cent water.

5. A process according to claim 1 wherein a portion of said oil-rich phase is recycled to the extraction zone and to the first and second fractionation zones, the remaining portion thereof being passed to a washing zone where it is contacted with liquid water to remove dissolved furfural therefrom, the resulting furfural-free oil being recovered from said washing zone.

References Cited in the file of this patent
UNITED STATES PATENTS

| | | |
|---|---|---|
| 1,669,151 | Wagner | May 8, 1928 |
| 2,024,117 | Stratford | Dec. 10, 1935 |
| 2,137,499 | Moravec | Nov. 22, 1938 |
| 2,419,039 | Scarth | Apr. 15, 1947 |
| 2,507,861 | Manley | May 16, 1950 |
| 2,526,722 | Beavon | Oct. 24, 1950 |
| 2,534,383 | Arnold et al. | Dec. 19, 1950 |
| 2,567,172 | Arnold et al. | Sept. 11, 1951 |